(12) United States Patent
Ishikawa

(10) Patent No.: US 7,411,362 B2
(45) Date of Patent: Aug. 12, 2008

(54) CONTROL DEVICE AND CONTROL METHOD OF MOTOR-DRIVEN 4WD VEHICLE

(75) Inventor: Yasuki Ishikawa, Tokyo (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 297 days.

(21) Appl. No.: 10/986,312

(22) Filed: Nov. 12, 2004

(65) Prior Publication Data

US 2005/0103550 A1 May 19, 2005

(30) Foreign Application Priority Data

Nov. 14, 2003 (JP) ............... 2003-384960

(51) Int. Cl.
- *H02P 1/54* (2006.01)
- *H02P 5/00* (2006.01)
- *H02P 5/46* (2006.01)

(52) U.S. Cl. ...................................... 318/108
(58) Field of Classification Search ................. 318/108
See application file for complete search history.

(56) References Cited

U.S. PATENT DOCUMENTS

| | | | |
|---|---|---|---|
| 4,438,342 A | 3/1984 | Kenyon | |
| 5,589,743 A * | 12/1996 | King | 318/139 |
| 5,988,307 A * | 11/1999 | Yamada et al. | 180/243 |
| 6,938,713 B1 | 9/2005 | Tahara et al. | |
| 7,119,513 B2 | 10/2006 | Ishikawa | |
| 7,157,869 B2 | 1/2007 | Ishikawa | |
| 7,205,731 B2 | 4/2007 | Nagayama | |
| 2001/0008192 A1* | 7/2001 | Morisawa | 180/197 |
| 2001/0042649 A1* | 11/2001 | Maeda et al. | 180/65.4 |
| 2002/0123407 A1* | 9/2002 | Hanyu et al. | 475/5 |
| 2004/0163860 A1* | 8/2004 | Matsuzaki et al. | 180/65.2 |
| 2005/0122071 A1* | 6/2005 | King et al. | 318/139 |
| 2006/0152180 A1* | 7/2006 | Tahara et al. | 318/139 |

FOREIGN PATENT DOCUMENTS

| | | | |
|---|---|---|---|
| EP | 1 108 606 A2 | 6/2001 | |
| EP | 1 236 603 A2 | 9/2002 | |
| JP | 09-209790 A | 8/1997 | |
| JP | 2001-333507 A | 11/2001 | |
| JP | 2002-152911 A | 5/2002 | |
| JP | 2002-200932 A | 7/2002 | |

(Continued)

*Primary Examiner*—Lincoln Donovan
*Assistant Examiner*—Erick Glass
(74) *Attorney, Agent, or Firm*—Foley & Lardner LLP

(57) ABSTRACT

A control device of a motor-driven 4WD vehicle includes: a 42V alternator 2 driven by an engine 1 to generate 3-phase AC electricity of 42 volts; a rectifying circuit 14 which rectifies the 3-phase AC electricity generated by the 42V alternator 2 and which supplies DC electricity after rectification to a motor M1 which drives rear wheels; an inverter 3 which lowers the electricity generated by the 42V alternator 2 into 14 volts and which converts the lowered AC electricity into DC electricity; and a 14V battery E1 which is supplied with the electricity obtained by the inverter 3 and which is charged. With this configuration, a generator can function as both a motor generator for charging the 14V battery E1 and a motor generator for generating driving electricity of the motor M1, and the configuration of the device can be simplified.

6 Claims, 5 Drawing Sheets

FOREIGN PATENT DOCUMENTS

| | | |
|---|---|---|
| JP | 2004-320995 A | 11/2004 |
| JP | 2005-130597 A | 5/2005 |
| JP | 2005-143157 A | 6/2005 |
| JP | 2005-151685 A | 6/2005 |
| JP | 2005-151687 A | 6/2005 |
| WO | WO 01/21431 A1 | 3/2001 |

* cited by examiner

FIG. 5

| OPERATION MODE | 42V ALT | INVERTER | 14V BAT | SW1 | SW2 | REAR WHEEL DRIVING MOTOR | EXPLANATION OF OPERATION |
|---|---|---|---|---|---|---|---|
| START ENGINE | OPERATE ELECTRIC MOTOR | POWER RUNNING | CHARGE OR DISCHARGE | ON | OFF | STOP | · DRIVE 42V ATL BY BATTERY AND INVERTER |
| CHARGE BATTERY | OPERATE GENERATOR | REGENERATE OPERATION | CHARGE | ON | OFF | STOP | · GENERATE ELECTRICITY BY 42V ATL<br>· REGENERATIVELY OPERATE INVERTER AND CHARGE 14V BATTERY |
| DRIVE FOUR WHEELS (4WD) | OPERATE GENERATOR | STOP | STOP CHARGING | OFF | ON | DRIVE | · GENERATE ELECTRICITY BY 42V ATL<br>· CONVERT AC TO DC BY DIODE, AND DRIVE REAR WHEEL DRIVE MOTOR |

CONTROL DEVICE AND CONTROL METHOD OF MOTOR-DRIVEN 4WD VEHICLE

BACKGROUND OF THE INVENTION

The present invention relates to a control device and a control method for controlling a motor-driven 4WD vehicle in which front wheels or rear wheels are driven by an engine and the other wheels are driven by a motor.

As disclosed in Japanese Patent Applications Laid-Open No. 2002-152911 or No. 2002-200932, there is a known 4WD vehicle in which front wheels thereof are driven by a driving force generated by an engine, a motor is rotated by electricity generated by a generator which is rotated by the engine, and rear wheels of the vehicle are driven by a driving force generated by the motor.

SUMMARY OF THE INVENTION

In such a conventional vehicle, however, the generator provided for driving the rear wheels and the generator provided for supplying electricity to electrical components of the vehicle are separately provided. Therefore, there is a problem that the number of parts is increased and the layout of the vehicle is limited. There is also a problem that the weight and the cost of the vehicle are increased.

The present invention has been achieved in order to solve such conventional problems, and it is an object of the invention to provide a control device and a control method of a motor-driven 4WD vehicle capable of simplifying the configuration of the device.

To achieve the above object, the present invention provides a control device of a motor-driven 4WD vehicle in which front wheels or rear wheels of the vehicle are driven by an engine and the other wheels are driven by a motor if necessary, the control device comprising: a motor generator driven by the engine to generate first 3-phase AC electricity of first rating voltage; an inverter which lowers the first 3-phase AC electricity generated by the motor generator into second electricity of second rating voltage which is lower than the first rating voltage; a rectifying circuit which rectifies the first 3-phase AC electricity generated by the motor generator and which supplies third DC electricity of third rating voltage after rectification to the motor; and a battery which is supplied with the second electricity obtained by the inverter and which is charged.

BRIEF DESCRIPTION OF THE DRAWINGS

FIG. 5 is a diagram for explaining an operation state of each unit in the control device of a motor-driven 4WD vehicle of the embodiment of the invention.

DETAILED DESCRIPTION OF THE PREFERRED EMBODIMENTS

Figure 1:
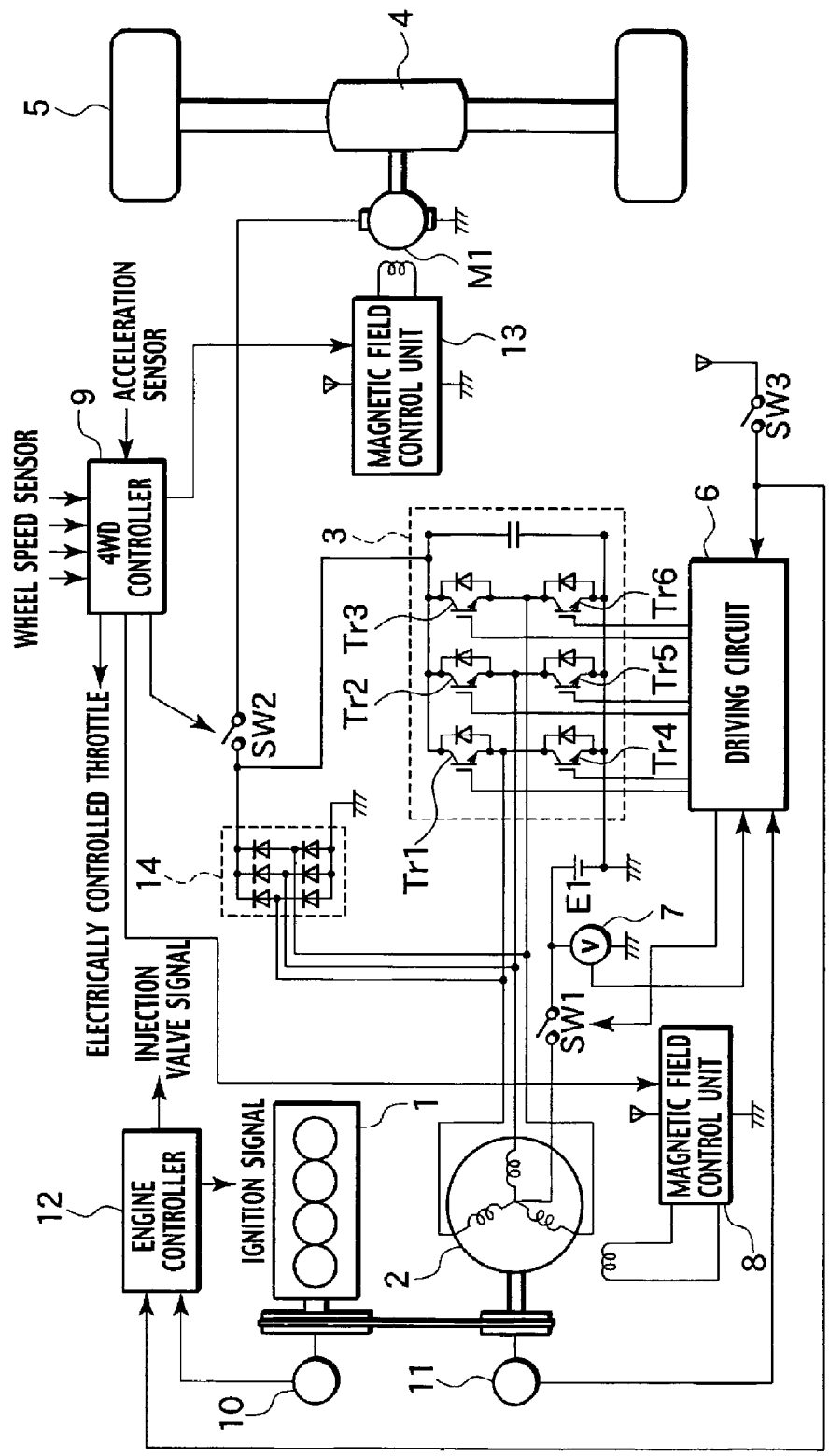
FIG. 1 is a block diagram showing the configuration of a control device of a motor-driven 4WD vehicle according to an embodiment of the present invention.

Embodiments of the present invention will be explained below with reference to the drawings. FIG. 1 is a block diagram showing the configuration of a control device of a motor-driven 4WD vehicle according to an embodiment of the invention. The control device of the embodiment controls a vehicle configured as to drive front wheels or rear wheels using an engine, and to drive the other wheels using a motor. As shown in FIG. 1, the control device includes an engine 1, a 42V alternator (motor generator) 2 which is connected to the engine 1 through a belt and which generates first 3-phase AC electricity (about 4 kW at maximum) of first rating voltage (11-42 Vrms) using rotation power of the engine 1. The control device also includes a 14V battery E1 which supplies electricity to various electric components mounted on the vehicle and a motor.

The control device also includes an inverter 3. The inverter 3 lowers the first 3-phase AC electricity which is output from the 42V alternator 2 to second rating voltage (14V) and then rectifies the lowered electricity, and supplies charging electricity (about 1 kW at maximum) to the 14V battery E1, or converts fifth DC electricity (about 1 kW at maximum) of fifth rating voltage (14V) which is output from the 14V battery E1 into fourth 3-phase AC electricity (about 1 kW at maximum) of fourth rating voltage (20 Vrms) and supplies the fourth 3-phase AC electricity to the 42V alternator 2, or boosts seventh DC electricity (about 1 kW at maximum) of seventh rating voltage (14V) which is output from the 14V battery E1 and generates sixth DC electricity (about 1 kW at maximum) of sixth rating voltage (28V) to be supplied to the motor M1.

The control device further includes a rectifying circuit 14 which rectifies the first 3-phase AC electricity generated by the 42V alternator 2 and supplies third DC electricity (about 4 kW at maximum) of third rating voltage (16-60V) to the motor M1.

The control device further includes a rotation sensor (revolution number detector) 10 which detects the revolution number of the engine 1, an engine controller 12 which outputs an ignition signal to the engine 1 based on a detection signal of the rotation sensor 10 and a detection signal of an acceleration sensor (not shown), and which controls the injection valve. The control device also includes a 4WD controller 9 which controls the actuation of the motor M1, and a driving circuit 6 which controls the driving of the inverter 3 and the 42V alternator 2.

The 4WD controller 9 inputs a detection signal of a wheel speed sensor (not shown) and a detection signal of the acceleration sensor, and switches between ON and OFF of a switch SW2 (second switch) interposed between the rectifying circuit 14 and the motor M1 based on the respective detection signals. The 4WD controller 9 outputs a control signal to a magnetic field control unit 13 which controls magnetic field current (current flowing through magnetic field winding) of the motor M1, and to a magnetic field control unit 8 which controls magnetic field current of the 42V alternator 2.

An output shaft of the motor M1 is connected to rear wheels 5 through a difference gear 4. Here, the rear wheels 5 are driven by the motor M1, but when the rear wheels 5 are driven by engine power, the motor M1 drives the front wheels.

The inverter 3 includes switching elements Tr1 to Tr6 such as six IGBTs or MOS-FETs. A ground-side terminal of the inverter 3 is connected to a minus terminal of the 14V battery E1, and is grounded.

A plus terminal of the 14V battery E1 is connected to a neutral point of the 42V alternator 2 having a 3-phase magnetic field winding through a switch SW1 (first switch). The 14V battery E1 is provided with a voltage sensor 7 which measures charging voltage of the 14V battery E1.

The driving circuit 6 inputs an operation signal of an acceleration switch SW3, a detection signal of the voltage sensor 7, and a detection signal of a position sensor 11 for detecting a rotation position of the 42V alternator 2. Upon reception of the detection signals, the driving circuit 6 outputs a drive signal to control input terminals of the six switching elements Tr1 to Tr6 of the inverter 3. The driving circuit 6 also outputs a control signal of ON/OFF operation to the switch SW1.

The inverter 3 is operated in a power running manner in a state where the switch SW1 is ON (closed) and the switch SW2 is OFF (opened) by controlling the driving circuit 6 and the 4WD controller 9. With this, the 42V alternator 2 can be operated as an electric motor, and the engine 1 can be started. If the inverter 3 is operated regeneratively during the driving of the engine 1, the 14V battery E1 can be charged. In a state where the switch SW1 is OFF and the switch SW2 is ON, the inverter 3 is stopped, and the first 3-phase AC electricity generated by the 42V alternator 2 is rectified by the rectifying circuit 14 to obtain the third DC electricity. If the third DC electricity is supplied to the motor M1, it is possible to rotate the motor M1 and the four wheels of the vehicle can be driven.

Next, the operation of the control device of a motor-driven 4WD vehicle of the embodiment will be explained in the following situations, i.e., (A) when the engine is started, (B) when the 14V battery is charged, and (C) when four wheels are driven. The operations of the 42V alternator 2, the inverter 3, the 14V battery E1, the switches SW1 and SW2, and the motor M1 are as shown in FIG. 5.

(A) Operation when Engine is Started

Figure 2:
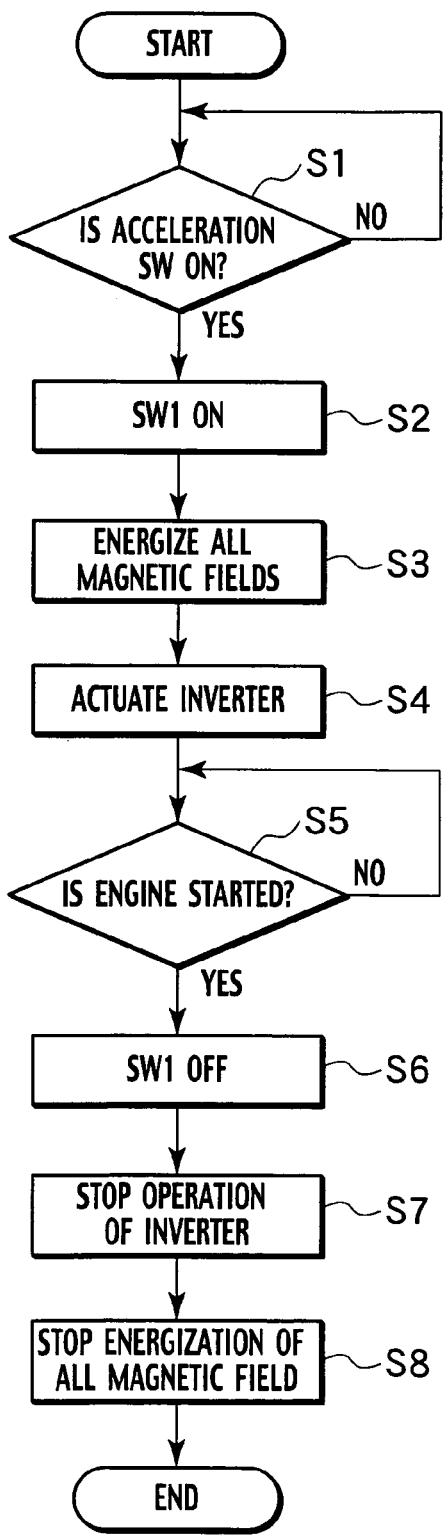
FIG. 2 is a flowchart showing an operation when an engine is started in the control device of a motor-driven 4WD vehicle of the embodiment of the invention.

FIG. 2 is a flowchart showing a processing operation when the engine is started. First, at step S1, it is determined whether the acceleration switch SW3 is ON. If the acceleration switch SW3 is ON, this means YES at step S1, and the switch SW1 is turned ON at step S2.

Next, at step S3, the magnetic field control unit 8 is operated and the magnetic field winding of the 42V alternator 2 is energized. Then, at step S4, the inverter 3 is operated in the power running manner, thereby converting the fifth DC electricity charged into the 14V battery E1 into the fourth 3-phase AC electricity of 42 volts, and the fourth 3-phase AC electricity is supplied to the 42V alternator 2, thereby rotating the 42V alternator 2.

With this operation, the engine 1 rotates, and if it is confirmed that the engine 1 is completely exploded and started at step S5, the switch SW1 is turned OFF at step S6, the power running operation of the inverter 3 is stopped at step S7, and the energization of the magnetic field winding of the 42V alternator 2 is stopped at step S8.

In this manner, the 42V alternator 2 is rotated using the fifth DC electricity charged into the 14V battery E1, and the engine 1 can be started.

(B) Operation when the 14V Battery is Charged

Figure 3:
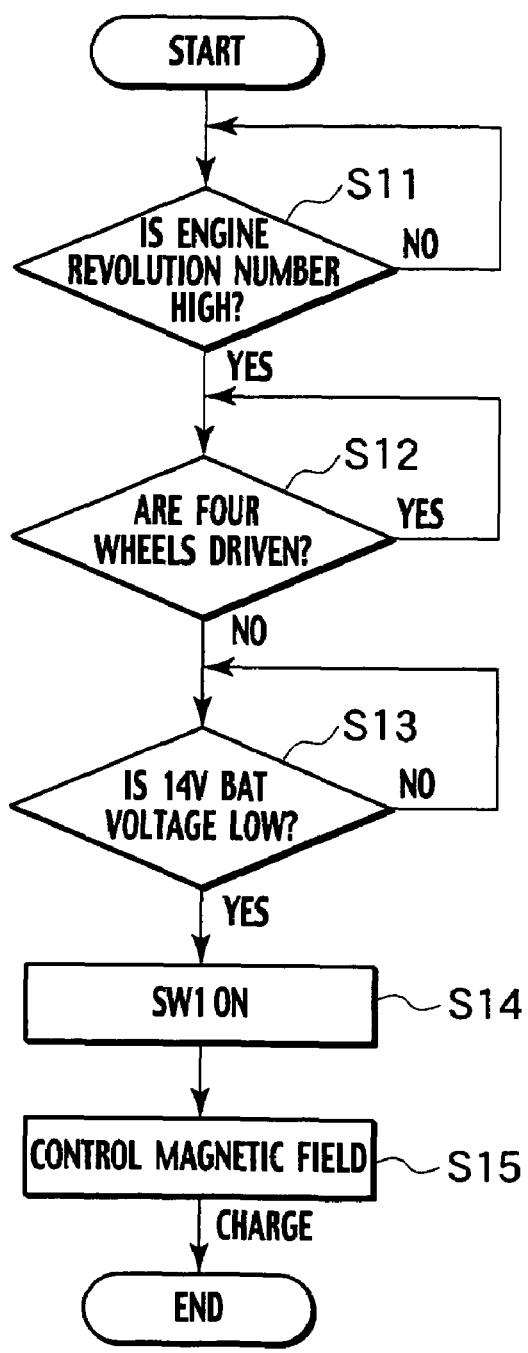
FIG. 3 is a flowchart showing an operation when a battery is charged in the control device of a motor-driven 4WD vehicle of the embodiment of the invention.

Next, the operation when the 14V battery E1 is charged will be explained with reference to the flowchart shown in FIG. 3.

First, at step S11, it is determined whether the revolution number of the engine 1 is equal to or greater than a predetermined revolution number based on a result of detection of the rotation sensor 10. If the revolution number is equal to or greater than the predetermined revolution number, it is determined whether the four wheels are currently being driven, i.e., whether the motor M1 is rotating at step S12.

When the four wheels are not driven, it is determined whether the charging voltage of the 14V battery E1 reaches a predetermined level based on a detection signal of the voltage sensor 7 at step S13. As a result, if it is determined that the charging voltage does not reach the predetermined level, the switch SW1 is turned ON at step S14, and the magnetic field of the 42V alternator 2 is controlled by the magnetic field control unit 8 at step S15. With this operation, the electricity generated by the 42V alternator 2 is lowered and rectified by the inverter 3, and supplied to the 14V battery E1 as the second DC electricity, and the 14V battery E1 is charged.

In this manner, under the condition that the revolution number of the engine 1 is equal to or greater than the predetermined revolution number and the four wheels are not driven, the 14V battery E1 can be charged using the electricity generated by the 42V alternator 2.

(C) Operation when Four Wheels are Driven

Figure 4:
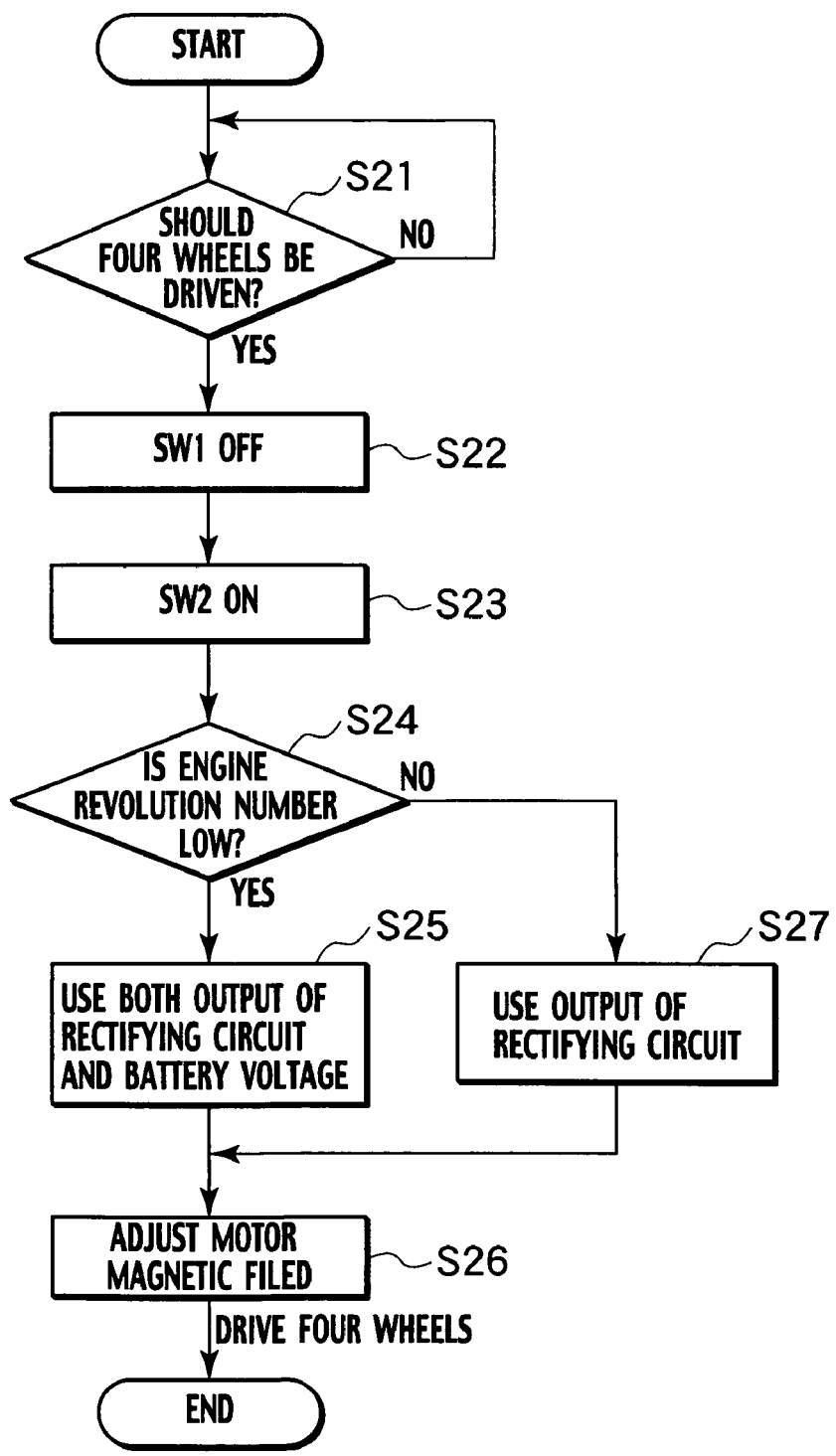
FIG. 4 is a flowchart showing an operation when the motor is driven in the control device of a motor-driven 4WD vehicle of the embodiment of the invention.

Next, the operation when the four wheels are driven will be explained with reference to the flowchart shown in FIG. 4. First, at step S21, it is determined whether the 4WD controller 9 drives the four wheels based on detection signals of the wheel speed sensor and the acceleration sensor. As a result, if the four wheels are to be driven, the switch SW1 is turned OFF at step S22, and the switch SW2 is turned ON at step S23. With this operation, the output side of the rectifying circuit 14 and the motor M1 are electrically connected to each other, and the output side of the inverter 3 and the motor M1 are also electrically connected to each other.

In this state, at step S24, it is determined whether the revolution number of the engine 1 is equal to or greater than the predetermined revolution number, or whether the revolution number is smaller than the predetermined revolution number based on a detection result of the rotation sensor 10. If the revolution number is equal to or greater than the predetermined revolution number, since sufficient electricity for driving the motor M1 can be obtained from the electricity generated by the 42V alternator 2, the third DC electricity obtained by the rectifying circuit 14 is supplied to the motor M1 at step S27.

On the other hand, if the revolution number of the engine 1 is smaller than the predetermined revolution number, sufficient electricity for driving the motor M1 can not be obtained from the electricity generated by the 42V alternator 2. Therefore, at step S25, the seventh DC electricity charged into the 14V battery E1 is boosted using the inverter 3, and the boosted DC electricity is supplied as the sixth DC electricity to the motor M1. That is, the motor M1 is driven using both the third DC electricity rectified by the rectifying circuit 14 and the sixth DC electricity obtained by boosting the seventh DC electricity charged into the 14V battery E1 by the inverter 3.

Then, at step S26, a control signal is output to the magnetic field control unit 13, the magnetic field of the motor M1 is adjusted, thereby rotating the motor M1 using the third DC electricity obtained from the rectifying circuit 14 or using DC electricity obtained from both the rectifying circuit 14 and the inverter 3. With this, the rear wheels 5 can be rotated and the four wheels can be driven.

In the control device of a motor-driven 4WD vehicle according to this embodiment, when the engine 1 is driven, the first 3-phase AC electricity generated by the 42V alternator 2 is rectified and lowered, and the 14V battery E1 can be charged. When the four wheels are to be driven, the first 3-phase AC electricity generated by the 42V alternator 2 is rectified by the rectifying circuit 14 and can be supplied to the motor M1. Therefore, the generator can be used both for charging the 14V battery E1 and for driving the motor M1, and the configuration of the device can be simplified.

That is, since electricity can be supplied to the motor and the battery having different rating voltages from one motor generator (42V alternator 2), the degree of freedom in layout is enhanced, and the weight and the cost can be reduced.

When the engine 1 is to be started, the electricity charged into the 14V battery E1 is converted into the seventh DC electricity using the inverter 3. With this operation, the 42V alternator 2 can be driven and thus, the engine 1 can be started. Therefore, other power sources for starting the engine 1 are unnecessary, and the configuration can be simplified.

That is, when the engine is to be started, the electricity charged into the battery is converted into the 3-phase AC electricity which is the first rating voltage using the inverter and with this electricity, the motor generator can be rotated and the engine can be started. Therefore, other power sources for starting the engine 1 are unnecessary, and the configuration can be simplified.

Further, when the four wheels are driven, the revolution number of the engine 1 is detected, and if the detected revolution number is equal to or greater than the predetermined revolution number, the motor M1 is rotated using the third DC electricity rectified by the rectifying circuit 14, and if the revolution number is smaller than the predetermined revolution number, the motor M1 is rotated using both the third DC electricity rectified by the rectifying circuit 14 and the sixth DC electricity obtained by boosting the seventh DC electricity charged into the 14V battery E1. Therefore, even when the revolution number of the engine 1 is low, electricity required for reliably driving the motor M1 can be supplied, and the four wheels can smoothly be driven.

That is, when the motor is driven, if the revolution number of the engine detected by the revolution number detector is smaller than the predetermined revolution number, the motor is supplied with electricity using both the third DC electricity rectified by the rectifying circuit and the sixth DC electricity obtained by boosting the seventh DC electricity charged into the battery. Therefore, even when the revolution number of the engine is low, electricity required for driving the motor can be supplied, and the motor can smoothly be rotated.

Further, since the 42V alternator 2 is rotated and the engine 1 is started when the acceleration switch SW3 is turned ON, idling stop can be realized, and fuel economy can be improved.

That is, since the engine is started when the acceleration switch which detects the acceleration operation is turned ON, idling stop can be realized, and fuel economy can be improved.

Further, the starting operation of the engine 1, the charging operation to the 14V battery E1, and the driving operation of the motor M1 are switched over by switching between the ON (close) and OFF (open) of the switches SW1 and SW2. Therefore, when the engine 1 is started or the 14V battery E1 is charged, if the switch SW2 is turned OFF, the motor M1 and the inverter 3 can reliably be separated from each other. When the motor M1 is driven, the 14V battery E1 and the inverter 3 can reliably be separated from each other. Therefore, it is possible to prevent occurrence of erroneous operation, and operability can be enhanced.

That is, when the engine is started or the battery is charged, the motor and the inverter can reliably be separated from each other, and when the motor is driven, the battery and the inverter can reliably be separated from each other by switching between the closed state and the opened state of the first switch and the second switch. Therefore, it is possible to prevent occurrence of erroneous operation, and operability can be enhanced.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of a Patent Application No. TOKUGAN 2003-384960 with a filing date of Nov. 14, 2003, is hereby incorporated by reference.

What is claimed is:

1. A control device of a motor-driven 4WD vehicle which controls the vehicle such that one of front wheels and rear wheels of the vehicle are driven by an engine and the other of the front wheels and the rear wheels are driven by a motor if necessary, the control device comprising:
   means for generating a first 3-phase AC electricity of a first rating voltage using rotation power of the engine;
   means for lowering the first 3-phase AC electricity into a second DC electricity of a second rating voltage which is lower than the first rating voltage;
   means for rectifying the first 3-phase AC electricity and supplying a third DC electricity of a third rating voltage after rectification to the motor; and
   means for being supplied with the second DC electricity and for being charged,
   wherein the means for generating has a function of generating the first 3-phase AC electricity when the means for generating is driven by the engine, and also a function of rotating as a motor when a fourth 3-phase AC electricity of a fourth rating voltage is supplied to the means for generating,
   wherein the means for lowering is also a means for boosting a fifth DC electricity of a fifth rating voltage accumulated in a battery to the fourth 3-phase AC electricity, and
   wherein the means for generating generates a driving force by the fourth 3-phase AC electricity, and the engine is started by the driving force.

2. A control device of a motor-driven 4WD vehicle which controls the vehicle such that one of front wheels and rear wheels of the vehicle are driven by an engine and the other of the front wheels and the rear wheels are driven by a motor if necessary, the control device comprising:
   a motor generator driven by the engine to generate a first 3-phase AC electricity of a first rating voltage;
   an inverter which lowers the first 3-phase AC electricity generated by the motor generator into a second DC electricity of a second rating voltage which is lower than the first rating voltage;
   a rectifying circuit which rectifies the first 3-phase AC electricity generated by the motor generator and which supplies a third DC electricity of a third rating voltage after rectification to the motor; and
   a battery which is supplied with the second DC electricity obtained by the inverter and which is charged,
   wherein the motor generator has a function of generating the first 3-phase AC electricity when the motor generator is driven by the engine, and also a function of rotating as a motor when a fourth 3-phase AC electricity of a fourth rating voltage is supplied to the motor generator,
   wherein the inverter boosts a fifth DC electricity of a fifth rating voltage accumulated in the battery to the fourth 3-phase AC electricity, and wherein the motor generator generates a driving force by the fourth 3-phase AC electricity, and the engine is started by the driving force.

3. A control device of a motor-driven 4WD vehicle which controls the vehicle such that one of front wheels and rear wheels of the vehicle are driven by an engine and the other of the front wheels and the rear wheels are driven by a motor if necessary, the control device comprising:

a motor generator driven by the engine to generate a first 3-phase AC electricity of a first rating voltage;

an inverter which lowers the first 3-phase AC electricity generated by the motor generator into a second DC electricity of a second rating voltage which is lower than the first rating voltage;

a rectifying circuit which rectifies the first 3-phase AC electricity generated by the motor generator and which supplies a third DC electricity of a third rating voltage after rectification to the motor;

a battery which is supplied with the second DC electricity obtained by the inverter and which is charged; and a revolution number detector which detects a revolution number of the engine, wherein when the detected revolution number of the engine detected by the revolution number detector is smaller than a predetermined revolution number, the motor is driven using both the third DC electricity which is generated by the motor generator and rectified by the rectifying circuit, and a sixth DC electricity obtained by boosting a seventh DC electricity charged into the battery by the inverter.

4. The control device of a motor-driven 4WD vehicle according to claim 2, wherein the engine is started when an acceleration switch, which is mounted on the vehicle and which detects acceleration operation, is turned ON.

5. A control device of a motor-driven 4WD vehicle which controls the vehicle such that one of front wheels and rear wheels of the vehicle are driven by an engine and the other of the front wheels and the rear wheels are driven by a motor if necessary, the control device comprising:

a motor generator driven by the engine to generate a first 3-phase AC electricity of a first rating voltage;

an inverter which lowers the first 3-phase AC electricity generated by the motor generator into a second DC electricity of a second rating voltage which is lower than the first rating voltage;

a rectifying circuit which rectifies the first 3-phase AC electricity generated by the motor generator and which supplies a third DC electricity of a third rating voltage after rectification to the motor;

a battery which is supplied with the second DC electricity obtained by the inverter and which is charged, wherein the motor is driven using both the third DC electricity which is generated by the motor generator and rectified by the rectifying circuit, and a sixth DC electricity obtained by boosting a seventh DC electricity charged into the battery by the inverter;

a first switch which switches a connection state between the inverter and the battery; and a second switch which switches a connection state between the rectifying circuit and the motor, wherein when the engine is to be started, the first switch is closed and the second switch is opened for supplying the seventh DC electricity charged into the battery to the inverter, and when the battery is to be charged, the first switch is closed and the second switch is opened for supplying the second DC electricity lowered by the inverter and rectified to the battery, and when the motor is to be driven, the first switch is opened and the second switch is closed for supplying the third DC electricity rectified by the rectifying circuit to the motor.

6. A control method of a motor-driven 4WD vehicle which controls the vehicle such that one of front wheels and rear wheels of the vehicle are driven by an engine and the other of front wheels and rear wheels are driven by a motor if necessary, the control method comprising the operations of:

generating a first 3-phase AC electricity of a first rating voltage using rotation power of the engine;

rectifying the first 3-phase AC electricity to a second DC electricity of a second rating voltage which is lower than the first rating voltage, and supplying the second DC electricity to a battery for charging the battery, when the battery is to be charged; and controlling such that the first 3-phase AC electricity is rectified to a third DC electricity of a third rating voltage, and the third DC electricity is supplied to the motor for rotating the motor, when the motor is to be driven, wherein the step of generating is performed by a motor generator, wherein the motor generator has a function of generating the first 3-phase AC electricity when the motor generator is driven by the engine and also a function of rotating as a motor when a fourth 3-phase AC electricity of a fourth rating voltage is supplied to the motor generator, wherein an inverter boosts a fifth DC electricity of a fifth rating voltage accumulated in the battery to the fourth 3-phase AC electricity, and wherein the motor generator generates a driving force by the fourth 3-phase AC electricity, and the engine is started by the driving force.

* * * * *